United States Patent
Hellman

(10) Patent No.: US 7,277,100 B2
(45) Date of Patent: Oct. 2, 2007

(54) MANAGING MULTI-COMPONENT DATA

(75) Inventor: Tim Hellman, Concord, MA (US)

(73) Assignee: Broadcom Advanced Compression Group, LLC, Andover, MA (US)

(*) Notice: Subject to any disclaimer, the term of this patent is extended or adjusted under 35 U.S.C. 154(b) by 128 days.

(21) Appl. No.: 10/729,275

(22) Filed: Dec. 5, 2003

(65) Prior Publication Data
US 2004/0113920 A1 Jun. 17, 2004

Related U.S. Application Data

(60) Provisional application No. 60/431,407, filed on Dec. 6, 2002.

(51) Int. Cl.
G09G 5/02 (2006.01)
(52) U.S. Cl. .................. 345/589; 345/544
(58) Field of Classification Search ............ 348/383; 345/544, 589
See application file for complete search history.

(56) References Cited

U.S. PATENT DOCUMENTS

| | | | | |
|---|---|---|---|---|
| 6,028,612 A * | 2/2000 | Balakrishnan et al. | ...... | 345/544 |
| 6,104,416 A * | 8/2000 | McGuinness | ............... | 345/544 |
| 6,205,181 B1* | 3/2001 | Hu et al. | ............... | 375/240.26 |
| 2003/0095126 A1* | 5/2003 | Dean | ......................... | 345/549 |
| 2004/0100577 A1* | 5/2004 | Linzer et al. | ............... | 348/383 |

* cited by examiner

Primary Examiner—Matthew C. Bella
Assistant Examiner—Mike Rahmjoo
(74) Attorney, Agent, or Firm—McAndrews Held & Malloy Ltd.

(57) ABSTRACT

Multi-component data is managed. Pixel image data is stored in a machine readable memory device. The pixel image data is decomposed into multiple colorspace components. The multiple colorspace components are stored in one continuous machine-readable memory segment of a machine-readable memory. The machine-readable memory has one or more burst boundaries.

8 Claims, 5 Drawing Sheets

MANAGING MULTI-COMPONENT DATA

CROSS REFERENCE TO RELATED APPLICATIONS

The present application claims the benefit of and priority to U.S. provisional application Ser. No. 60/431,407, filed Dec. 6, 2002, entitled "Method For Improving Memory Read Efficiency and Arithmetic Coding Speed," the entire disclosure of which is herein incorporated by reference.

TECHNICAL FIELD

The invention relates to managing multi-component data. In particular, an aspect of the invention relates to storing multiple colorspace components of a pixel image in a single memory segment.

BACKGROUND OF THE INVENTION

Video decoders include a function commonly referred to as "motion compensation." This function is necessary to allow the decoder to process numerous different video compression standards, including but not necessarily limited to: MPEG-1, MPEG-2, MPEG-4, H.263, H.264, and H.261. More specifically, motion compensation includes a process of copying a two-dimensional block of image data from a previously decoded reference frame to the frame currently being decoded. The location of the reference block relative to the current position in the current frame is specified by "motion vectors" included within the input code stream. Motion compensation allows for a compact specification of the data whenever the video stream is well modeled by translational motion.

Typically, reference frames that are used for motion compensation are stored in a relatively large memory (typically DRAM). To improve general performance, DRAMs are generally accessed in bursts of data (usually 2, 4, 8, or 16 data words in a burst). Accesses within a single burst are highly efficient (1 word per clock cycle with single data rate (SDR) DRAM, 2 words per clock cycle with double data rate (DDR) DRAM).

In cases where the memory data interface is 32 bits wide (word size of 4 bytes) and the burst size is 2 words, then each burst accesses 8 bytes (2 words×4 bytes per word). However, bursts can only access data aligned to burst boundaries, and therefore a burst of N words must be aligned to an address integrally divisible by N.

Furthermore, additional memory read inefficiencies are introduced when each pixel contains multiple components of an image and, as in motion compensation, it is necessary to retrieve the data for all of the image components to use the data. This further increases the number of bursts necessary to read a particular set of data.

SUMMARY OF THE INVENTION

In general, the invention relates to managing multi-component data, e.g., data with multiple colorspace components. Aspects of the invention relate to reducing the number of bursts needed to read multiple colorspace components of a pixel image.

In at least one aspect, invention relates to a method of storing data. Pixel image data is stored in a machine-readable memory. Pixel image data is decomposed into multiple colorspace components, which are then stored in one continuous machine-readable memory segment in a machine-readable memory, where the machine readable memory has one or more burst boundaries.

The machine readable memory can be volatile memory such as DRAM or SRAM. In one embodiment, the colorspace components are luminance, red difference sample, and blue difference sample. In another embodiment, the colorspace components are red color level, green color level, and blue color level. In yet another embodiment, the pixel image data includes a first data byte that is registered at a memory address immediately following a burst boundary. In another embodiment, the pixel image data includes a first data byte and subsequent data bytes, and one of the subsequent data bytes is registered at a memory address immediately following a burst boundary.

In at least one aspect of the invention, pixel image data is retrieved from a machine-readable memory. Pixel image data is retrieved from a machine readable memory device having one or more burst boundaries. The pixel image data comprises multiple colorspace components and was previously stored in the machine readable memory device in one continuous memory segment.

While particularly useful in the field of encoded video data, these methods are not limited to that specific application, and can be used in similar applications where video data is stored in and read from memory devices.

BRIEF DESCRIPTION OF THE DRAWINGS

In the drawings, like reference characters generally refer to the same elements throughout the different views. In addition, the drawings are not necessarily to scale, emphasis instead generally being placed upon illustrating the principles of the invention.

DETAILED DESCRIPTION

Image pixel data can be comprised of multiple components. For example, YUV colorspace is comprised of three components, luminance, which represents the brightness level and is abbreviated as Y, the Red Difference sample abbreviated as U, and the Blue Difference sample abbreviated as V. Previous methods for storing the values for YUV colorspace stored each component in a separate memory space.

Figure 1:
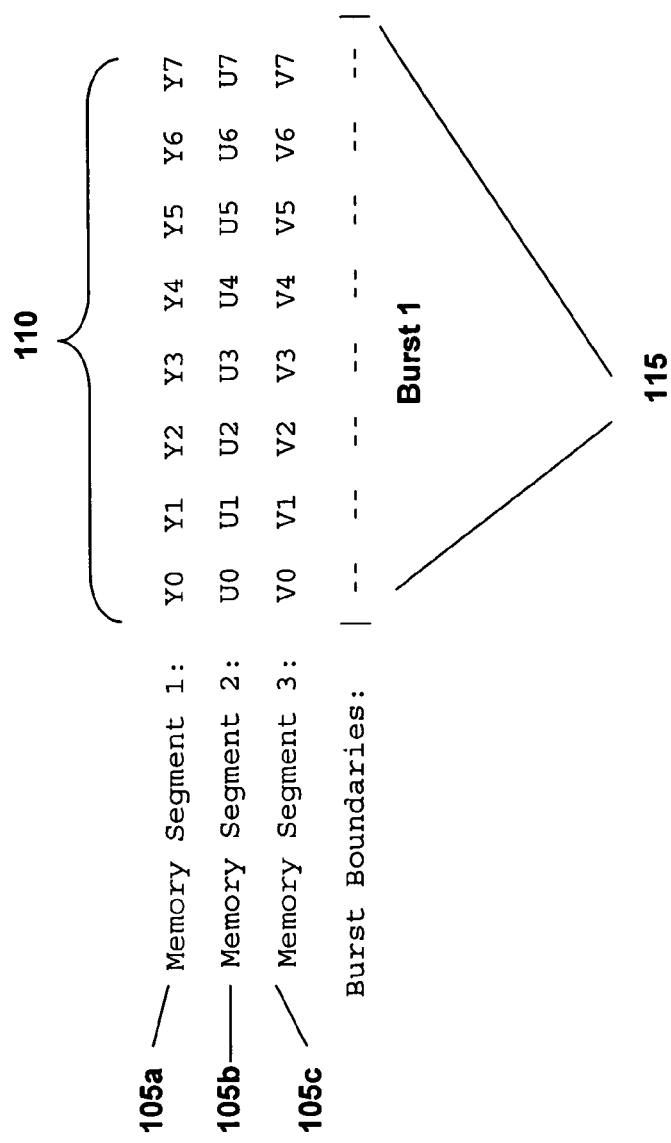
FIG. 1 illustrates storing different colorspace components in different memory segments.

FIG. 1 illustrates an example embodiment in which multi-component pixel image data is stored in multiple memory segments. Three memory segments, 105a, 105b, and 105c are allocated to store the image pixel data 110. One component of the data 110 is allocated to each memory segment—the Y component is allocated to segment 1 105a, the U component is allocated to segment 2 105b, and the V component is allocated to segment 3, 105c. Furthermore, the memory segments are constrained by burst boundaries 115 defining the bytes of data read during each clock cycle.

Where each component (the Y0, U0 and V0 components) is stored in such a manner that they are registered at the first memory address following a burst boundary, the number of bursts needed to read the entire data set is 3—one burst for each segment. The efficiency of accessing data in this manner is 100%—i.e., 24 total bytes are needed and 24 bytes are read.

Figure 2:
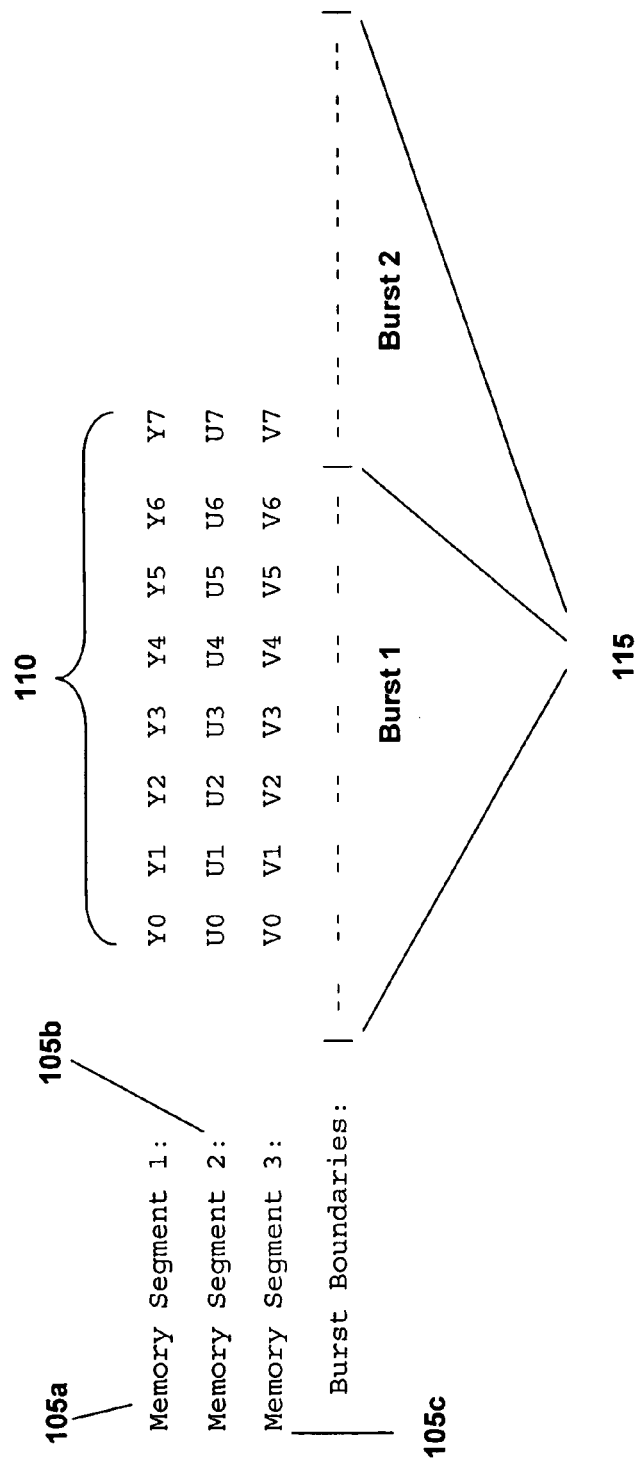
FIG. 2 illustrates storing different colorspace components in different memory segments.

FIG. 2, however, illustrates an example embodiment in which the first byte of each component (the Y0, U0 and V0 components) are stored at a memory address other than the first memory address following a burst boundary. In such cases, the read efficiency is reduced to 50%—6 bursts of 8 bytes each (48) to retrieve 24 bytes of desired data. When designing systems to that access image pixel data, the worst case efficiency must be accounted for, and therefore the speed at which the data can be read from memory is compromised.

Figure 3:
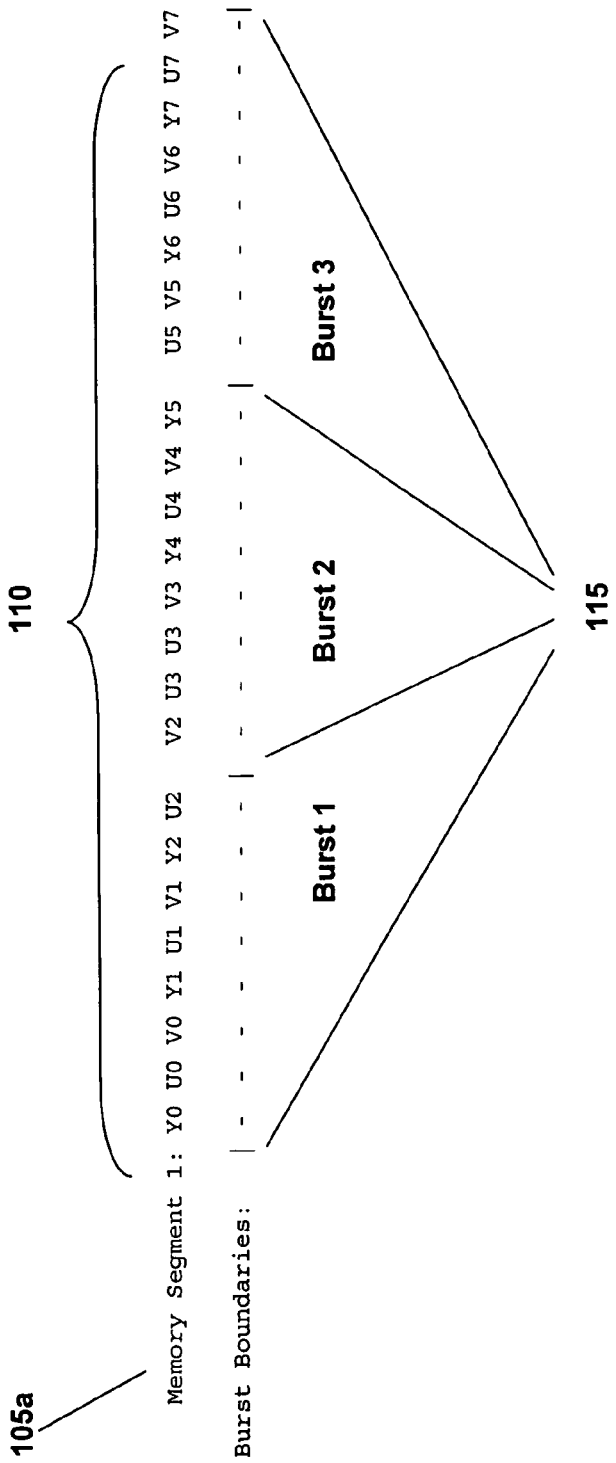
FIG. 3 illustrates storing different colorspace components in one memory segment in accordance with the invention.

FIG. 3 illustrates one possible embodiment of the invention, where the multiple YUV components of pixel image data are stored in one continuous memory segment. The entire set of pixel components 110 is stored in one memory segment 105a. Furthermore, the memory segment 105a has four burst boundaries 115. Each burst boundary 115 defines a set of memory addresses that are read for each burst. Where the first byte of data (Y0) is registered at the first data address following a burst boundary, three bursts are needed to read the 24 bytes of data 110. This alignment produces a 100% read efficiency, because 24 bytes of data are read to retrieve the 24 desired bytes.

Figure 4:
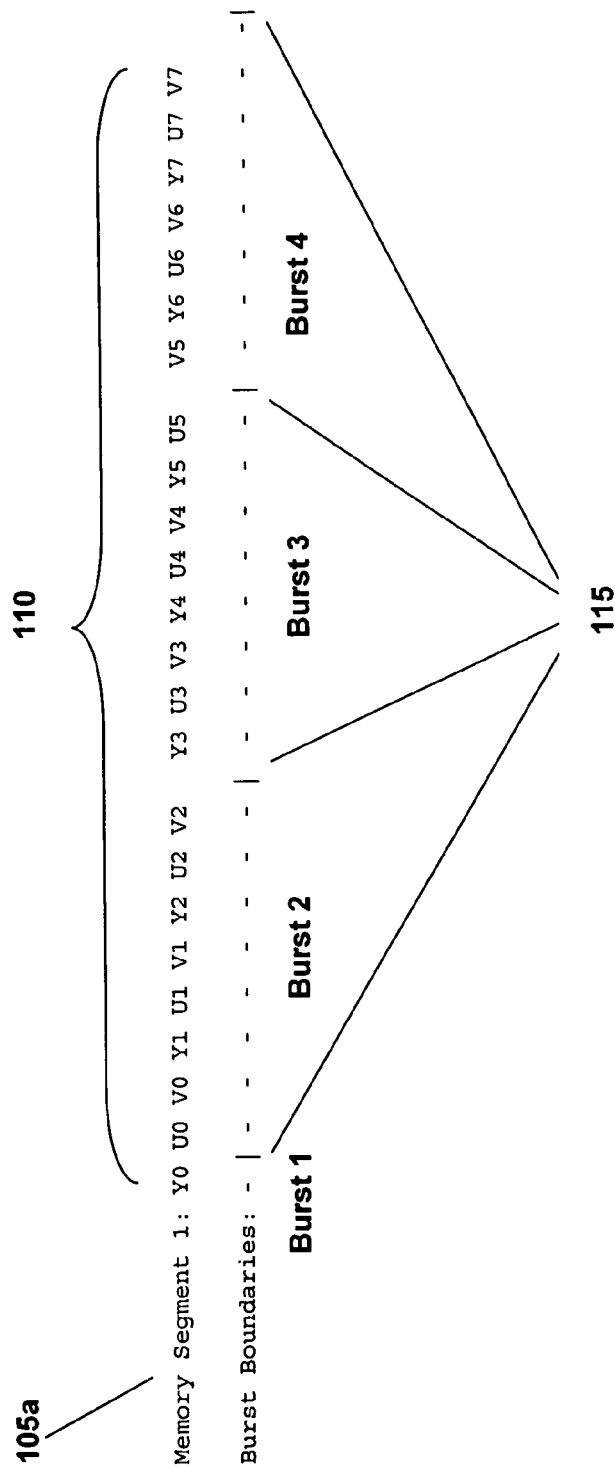
FIG. 4 illustrates storing different colorspace components in one memory segment in accordance with the invention.

When the three pixel components 110 are stored in one memory segment 105a, the worst case efficiency is increased. Referring to FIG. 4, the first byte of data (Y0) is stored at a memory address other than one immediately following a burst boundary. Therefore, to read all 24 bytes of data 110, four bursts are needed, resulting in a read efficiency of 75% (8 bytes per burst multiplied by 4 bursts equals 32 bytes read to retrieve 24 desired bytes of data). This represents a 50% increase (75% compared to 50%) in read efficiency over the previous methods described above.

Figure 5:
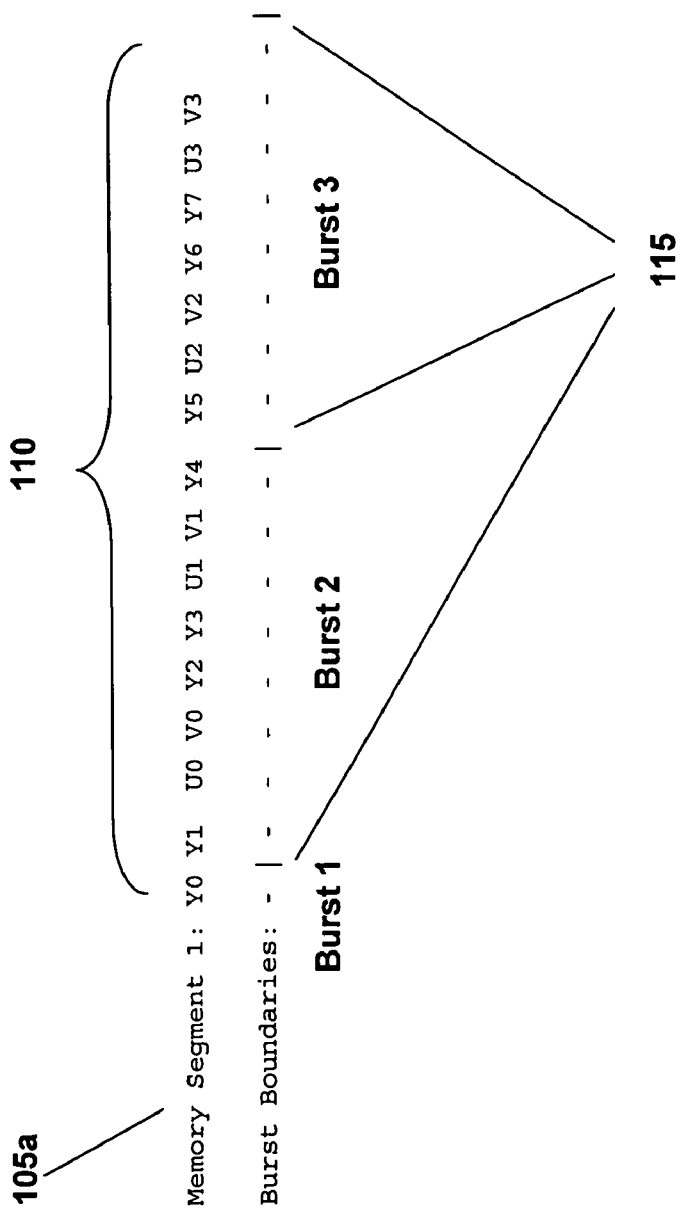
FIG. 5 illustrates storing different colorspace components in one memory segment in accordance with the invention, wherein the Y component is sampled twice as often as the U and V components.

In some embodiments using the YUV colorspace components, the Y component (luminance) is sampled twice as often as the color samples, U and V, such that every 2 pixels share the same color values. Referring to FIG. 5, 16 bytes of data 110 are stored in one memory segment 105a. Furthermore, and illustrating the 2:1 luminance to color sampling rate, two Y components are stored for each set of two color components—i.e. the U0 and V0 color components are used for both the Y0 and Y1 luminance component. In this instance, the read efficiency is 67% (3 bursts of 8 bytes each to retrieve 16 desired bytes of data). This represents a 34% increase (67% compared to 50%) in read efficiency over the previous methods described above.

The methods described above may be implemented using one or more data processing devices. In some embodiments, the data processing devices may implement the functionality of the present invention in hardware, using, for example, a computer chip. The data processing device may receive signals in analog or digital form. In other embodiments, the data processing device may implement the functionality of the present invention as software on a general purpose computer, video display device, or other electronic device. In such an embodiment, the program may be written in any one of a number of programming languages, such as FORTRAN, PASCAL, C, C++, C#, Tcl, or BASIC. Further, the program can be written in a script, macro, or functionality embedded in commercially available software, such as EXCEL or VISUAL BASIC.

Additionally, the software could be implemented in an assembly language directed to a microprocessor resident on a video display device, computer or other electronic device. For example, the software can be implemented in Intel 80×86 assembly language if it is configured to run on an IBM PC or PC clone. The software may be embedded on an article of manufacture including, but not limited to, "machine-readable program means" such as a floppy disk, a hard disk, an optical disk, a magnetic tape, a PROM, an EPROM, ROM, or CD-ROM.

Variations, modifications, and other implementations of what is described herein will occur to those of ordinary skill in the art without departing from the spirit and the scope of the invention as claimed. Accordingly, the invention is to be defined not by the preceding illustrative description but instead by the spirit and scope of the following claims.

What is claimed is:

1. A method for managing pixel image data, the method comprising:
   retrieving the pixel image data comprising a plurality of colorspace components, wherein each colorspace components is one of three different types;
   storing the plurality of colorspace components in one continuous memory segment in a memory, the memory having a plurality of bursts and one or more burst boundaries, wherein one type of colorspace component is stored in each burst; and
   copying the pixel image data at least in part by accessing the plurality of colorspace components from the memory.

2. The method of claim 1 wherein the memory comprises volatile memory.

3. The method of claim 2 wherein the volatile memory comprises dynamic random access memory.

4. The method of claim 2 wherein the volatile memory comprises static random access memory.

5. The method of claim 1 wherein the colorspace components comprise luminance, red difference sample, and blue difference sample.

6. The method of claim 1 wherein the colorspace components comprise a red color level, a green color level, and a blue color level.

7. The method of claim 1 wherein the pixel image data comprises a first data byte, the first data byte being registered at a memory address immediately following one of the one or more burst boundaries.

8. The method of claim 1 wherein the pixel image data comprises a first data byte and subsequent data bytes, one of the subsequent data bytes being registered at a memory address immediately following one of the one or more burst boundaries.

* * * * *